Figure 1:
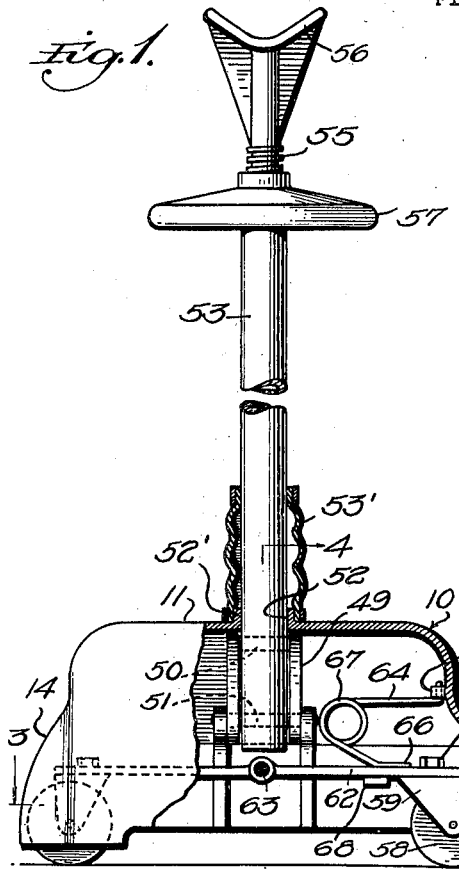

Jan. 2, 1940.    P. J. KROLL    2,185,791
VEHICLE ROCKING APPARATUS
Filed May 5, 1936    3 Sheets-Sheet 1

Inventor
P. J. KROLL

Jan. 2, 1940.   P. J. KROLL   2,185,791
VEHICLE ROCKING APPARATUS
Filed May 5, 1936   3 Sheets-Sheet 2
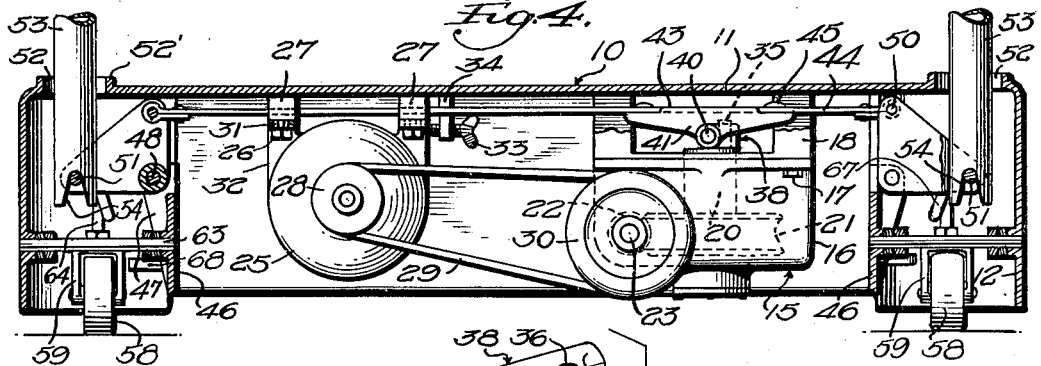
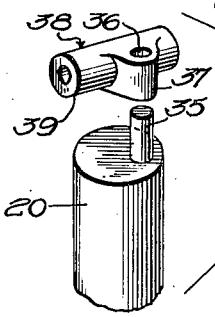
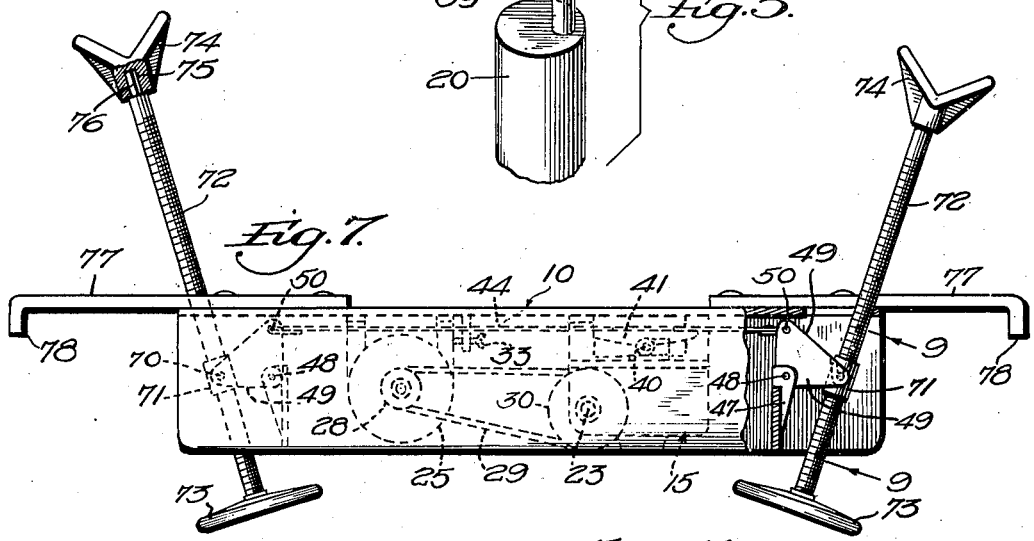
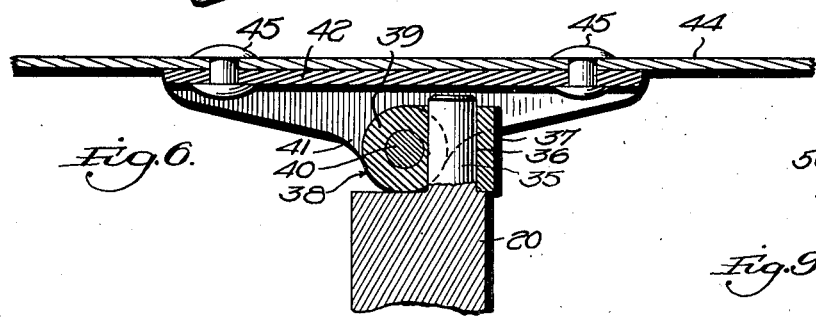
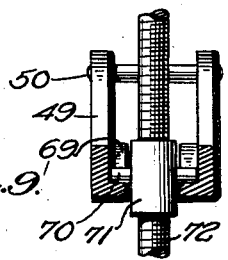
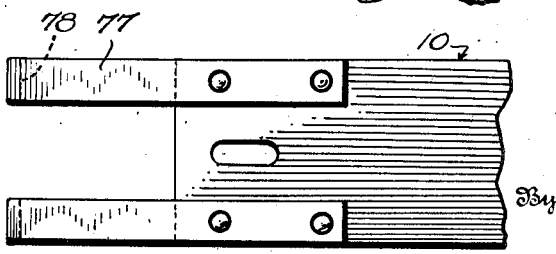
Inventor
P. J. KROLL Jan. 2, 1940.     P. J. KROLL     2,185,791
VEHICLE ROCKING APPARATUS
Filed May 5, 1936     3 Sheets-Sheet 3

Inventor
P. J. KROLL

Patented Jan. 2, 1940

2,185,791

UNITED STATES PATENT OFFICE 2,185,791

VEHICLE ROCKING APPARATUS

Philip J. Kroll, Houston, Tex., assignor to Marjorie Kroll, Cambridge, Mass.

Application May 5, 1936, Serial No. 78,065

17 Claims. (Cl. 73—51)

This invention relates to vehicle rocking apparatus, and more particularly to an apparatus for rocking the body of a motor vehicle to assist in the lubrication of the vehicle parts.

The present invention is an improvement over the structure shown in my copending application Serial No. 755,038, filed November 27, 1934. In such pending application I have disclosed a novel apparatus having a pair of upstanding jack shafts alternately vertically reciprocated by means of a motor from which motion is transmitted to the jack shafts in a novel manner. Such apparatus is highly practicable for use in rocking the body of a motor vehicle while lifting the weight of the body from the springs, thus facilitating the application of lubricant to the shackle bolts, spring leaves and other parts of the vehicle.

An important object of the present invention is to provide an apparatus which is adapted to perform all of the functions of the apparatus of my copending application referred to, but wherein a simplified and more compact apparatus is provided.

A further object is to provide simple and novel means for transmitting the alternate reciprocating motion to the jack shafts from the single source of power employed.

A further object is to provide means for supporting the jack shafts and transmitting reciprocatory motion thereto without the use of means for guiding the jack shafts for direct vertical movement, the apparatus being provided with means for permitting limited swinging movement of the jack shafts laterally with respect to the vehicle and for preventing movement of the jack shafts longitudinally with respect to the vehicle.

A further object is to provide novel and simplified means for supporting the source of power and the power transmitting means within the body of the apparatus.

A further object is to provide a simple and compact form of vehicle rocking apparatus which lends itself readily for use either with vehicle lifts or with the grease pits employed in some vehicle service stations.

A further object is to provide novel means associated with the rocking apparatus for preventing swinging movement of the rails of a lift in connection with which the apparatus is being employed.

Other objects and advantages of the invention will become apparent during the course of the following description.

In the drawings I have shown several embodiments of the invention. In this showing—

Figure 2:
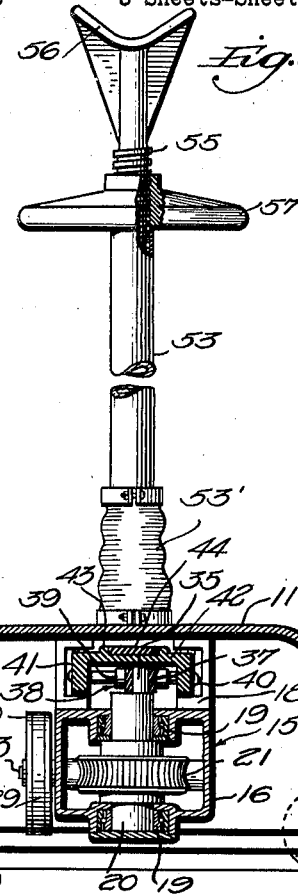
Figure 3:
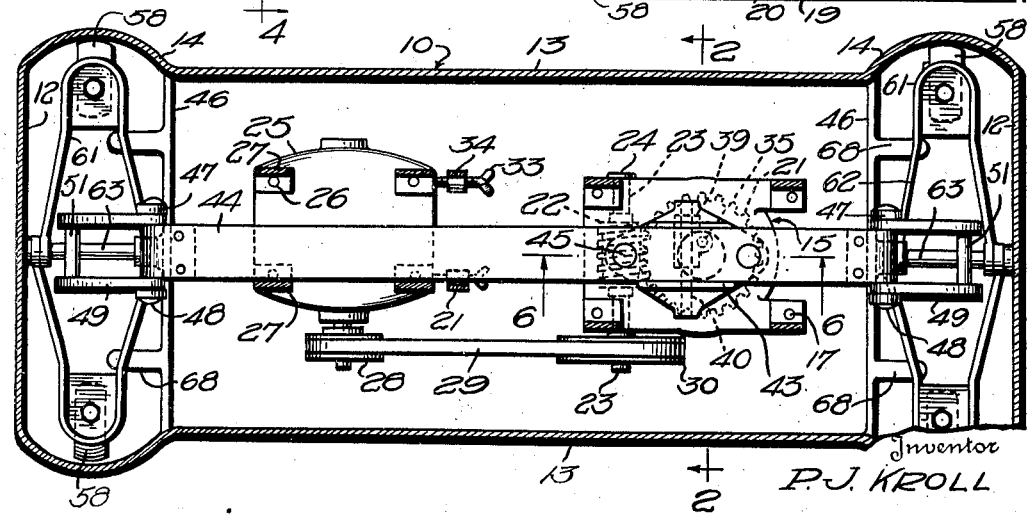
Figure 10:
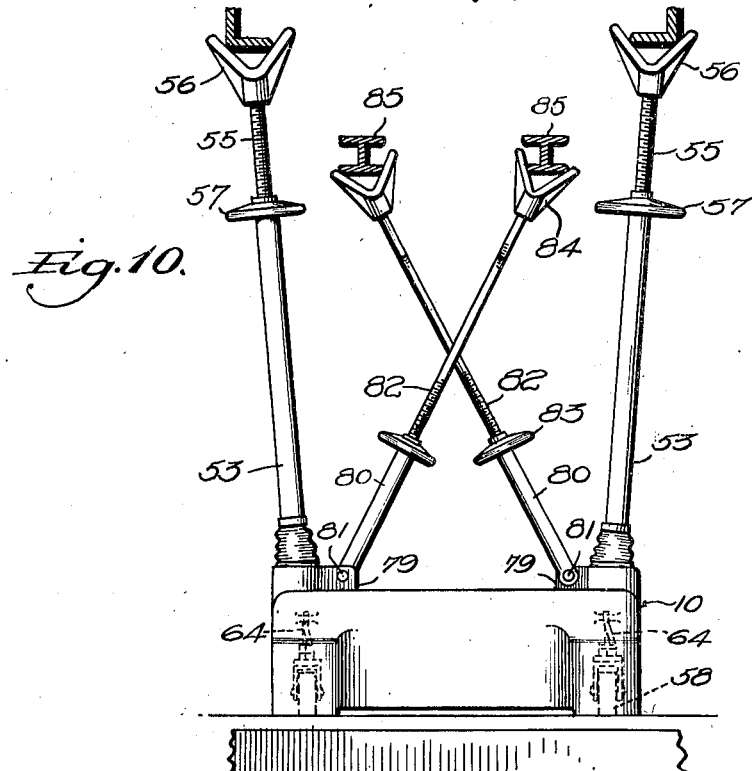
Figure 11:
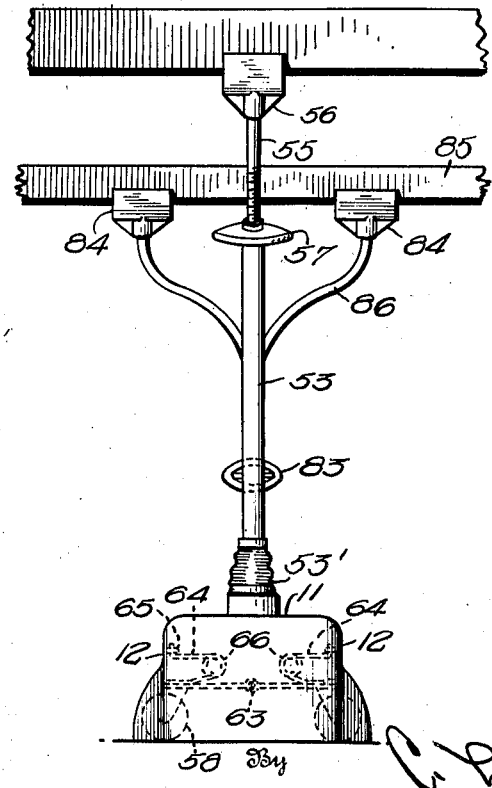

Figure 1 is an end elevation of one form of the apparatus, parts being broken away, Figure 2 is a section taken substantially on line 2—2 of Figure 3, Figure 3 is a horizontal sectional view of the apparatus taken through the casing thereof substantially on line 3—3 of Figure 1, the interior parts of the apparatus being shown in elevation, Figure 4 is a section on line 4—4 of Figure 1, parts being shown in elevation, Figure 5 is a fragmentary detail perspective view of a power transmitting crosshead and associated elements, Figure 6 is an enlarged fragmentary vertical sectional view on line 6—6 of Figure 3, Figure 7 is a side elevation of a modified form of apparatus, parts being broken away and parts being shown in section, Figure 8 is a plan view of one end of the apparatus shown in Figure 7, the jack post and associated elements being omitted, Figure 9 is an enlarged fragmentary sectional view on line 9—9 of Figure 7, Figure 10 is a side elevation of a further modified form of apparatus, the vehicle chassis side rails and the rails of the vehicle lift being shown in section, and, Figure 11 is an end elevation of the same.

Referring to Figures 1, 2 and 3, the numeral 10 designates the main support for the apparatus, which is in the form of a preferably integral cast housing having a top wall 11, end walls 12 and side walls 13. The side walls 13 are bulged adjacent their ends as at 14 to provide for supporting casters to be referred to later.

A reduction gearing indicated as a whole by the numeral 15 is arranged beneath the top wall 11 of the housing. The reduction gearing includes a casing 16 secured as at 17 to depending arms 18 preferably cast integral with the top wall 11. As shown in Figure 2, the casing 16 is provided with upper and lower bearings 19 rotatably supporting a shaft 20 carrying a worm wheel 21. This wheel meshes with a worm 22 carried by a shaft 23 extending transversely of the apparatus and journaled in suitable bearings 24 carried by the casing 16.

A motor 25 (Figures 3 and 4) is secured as at 26 to depending arms 27 preferably formed integral with the top wall 11 of the support. The motor carries a pulley 28 around which passes a belt 29, and this belt, as shown in Figures 3 and 4, also passes around a pulley 30 carried by the shaft 23. The securing bolts 26 pass through slots 31 formed in upstanding arms 32 carried by the motor casing, and adjusting screws 33 are threaded in depending lugs 34 carried by the top wall 11 of the casing to adjust the position of the motor, and thus adjust the tension of the belt 29.

The shaft 20 of the reduction gearing is arranged vertically and is provided at its upper end with a vertical eccentric stub shaft 35 extending through an opening 36 formed in a vertical semicylindrical portion 37 forming a part of a crosshead indicated as a whole by the numeral 38. The stub shaft 35 is rotatable in the opening 36 and is relatively slidable vertically therein for a purpose to be described. The crosshead includes a horizontal cylindrical portion 39 slidably receiving a shaft 40 (see Figures 2 and 6). The ends of the shaft 40 are secured to depending arms 41 formed integral with a main transmitting member having a horizontal top wall 42. Parallel ribs 43 are preferably formed on the upper face of the wall 42 as shown in Figures 2 and 3, and a carrier, preferably in the form of a strap steel member 44 lies against the upper face of the wall 42 between the ribs 43. The carrier 44 is preferably riveted as at 45 to the top wall 42 of the main transmitting member. It will become apparent that rotation of the shaft 20 reciprocates the carrier 44, while the transverse component of movement of the stub shaft 35 is absorbed by the sliding movement of the crosshead on the shaft 40.

The housing 10 is provided at a point spaced from each end thereof with a transverse wall 46 having its upper edge terminating a substantial distance below the top wall 11, as shown in Figure 4. Each end wall 46 carries a pair of spaced upstanding integral bearings 47 rotatably supporting a shaft 48 at its upper end. Each shaft 48 extends between parallel substantially triangular plates 49 forming a bell crank lever, each shaft 48 being secured to the plates forming the associated bell crank lever. The plates of each bell crank lever are further secured together at their upper corners by a pin 50 to which one end of the carrier 44 is secured, and accordingly it will be apparent that reciprocation of the carrier rocks each bell crank lever about the axis of the shaft 48. At the third corner of each pair of plates 49, a pin 51 extends between and is secured to such plates for a purpose to be described.

Each end of the upper housing wall 11 is provided centrally of the width thereof with an opening 52 through which the lower end of a tubular member 53 extends. Longitudinally of the apparatus, the openings 52 are elongated as shown in Figure 4, but each opening 52 is approximately equal in width to the diameter of its associated tubular member 53. Each opening 52 is defined by an upstanding flange 52', and a flexible boot 53' may be arranged with its lower end surrounding and secured to the flange 52' with its upper end secured to the corresponding tubular member 53, as shown in Figure 1. The lower end of each tubular member 53 is notched as at 54 to receive the associated pin 51 forming a pivotal support for the lower end of the tubular member. Accordingly it will be apparent that the rocking of the bell crank levers vertically reciprocates the tubular members, and while the size of the openings 52 is such as to prevent lateral movement of the upper ends of the tubular members, such members are adapted to partake of swinging movement longitudinally of the apparatus because of the length of the openings 52. The advantage of such construction will be referred to later.

A jack shaft 55 is slidable in the upper end of each tubular member 53, as shown in Figure 2. The upper end of each jack shaft is provided with an angular vehicle frame engaging head 56. These heads are normally arranged with the grooves therein extending transversely of the housing 10 and have been turned at right angles from their normal positions in Figures 1 and 2 for the purpose of illustration. A hand wheel 57 is threaded on each jack shaft and is supported by the upper end of the associated tubular housing 53. It will be apparent that upon being rotated, each hand wheel 57 remains in contact with the upper end of the associated tubular member 53, and imparts vertical movement to the jack shaft.

The apparatus is supported upon a plurality of rollers 58, one roller being arranged at each corner of the apparatus and being housed within the bulged casing portions 14 as indicated in Figures 1 and 3. Each roller is carried by a yoke 59 secured as at 60 to the free end of a lever 61 having a pair of arms 62 extending to the longitudinal center of the apparatus and pivotally supported by a shaft 63. Each shaft 63 is supported at one end in one of the end walls 12 and at its opposite end in the adjacent transverse wall 46. A torsion spring 64 is provided for urging each roller downwardly. Each torsion spring has one end secured to a lug 65 formed integral with the casing 10 and its other end 66 operating against one of the levers 61 to urge the latter downwardly. Each spring is coiled intermediate its ends as at 67. Downward movement of each lever 61 is limited by a lug 68 which may be formed integral with the adjacent wall 46.

The form of the invention described is particularly adapted for use in rocking vehicles supported on a vehicle lift of the type commonly employed in service stations. In Figures 7, 8 and 9 of the drawings I have illustrated a slightly modified type of apparatus which is adapted for rocking the body of a vehicle arranged over the greasing pit of a service station. Since the motor, reduction gearing and associated parts are identical with the parts previously described, they need not be referred to in detail. In the modified form of the invention the bell crank levers 49 do not have the pin 51 for supporting the jack shaft, the outer corner of each bell crank lever being provided with inwardly extending vertically opening recesses 69.

The recesses 69 of each bell crank lever are adapted to receive oppositely extending trunnions 70 carried by a crosshead 71 in which is threaded a jack shaft 72. The lower end of each jack shaft 72 carries a hand wheel 73 as shown in Figure 7. A vehicle engaging head 74 is supported by the upper end of each jack shaft 72 but is not integral therewith as in the form of the invention previously described. Each head 74 is provided with an opening 75 rotatably receiving the reduced upper end 76 of the associated jack shaft. Accordingly it will be apparent that the jack shafts are rotatable in their crossheads 71 to change the elevation of the heads 74, and the latter are adapted to remain fixed against rotation in engagement with the side frames of a motor vehicle, as will become apparent.

The ends of the main casing 10 are somewhat altered in the modified form of the invention. Since this device is adapted to be used over a greasing pit, there is no need for providing supporting rollers, and accordingly these elements are eliminated. In the form of the invention shown in Figures 7 and 8, the length of the casing 10 is such as to permit it to be arranged within the upper end of a greasing pit, and each end of the housing is provided with a pair of longitudinally extending arms 77 overhanging the greasing pit provided with downwardly turned ends 78.

In the use of a vehicle rocking apparatus beneath a vehicle lift, the rocking apparatus necessarily is arranged between the lift shaft and the ends of the lift rails, and when a lubricant applying nozzle is applied with substantial force against one of the lubricant fittings there is a tendency for the lift to rotate about its shaft. This action tends to transmit destructive forces to the vehicle rocking apparatus. This disadvantage is eliminated in the form of the invention shown in Figures 10 and 11. In such modified form of apparatus the rocking mechanism may be identical with the form of the invention shown in Figures 1 to 6 inclusive, the motion transmitting mechanism being arranged within the housing 10 which is normally supported by the spring pressed casters 58. Motion is transmitted in the manner previously described to the upwardly extending tubular members 53 whereby the jack shafts 55 transmit rocking motion to the vehicle frame. It will be apparent that when the hand wheels 57 are turned to elevate the jack shafts and thus lift the weight of the vehicle body from the chassis, the additional weight placed on the housing 10 overcomes the tension of the springs 64 of the rollers 58, thus causing the casing 10 to seat squarely upon the surrounding surface, as shown in Figure 10.

The additional devices illustrated in Figures 10 and 11 are operative for effectively preventing any swinging movement of the vehicle lift about its elevating shaft. Bosses 79 are cast integral with the casing 10 and pivotally support the lower ends of tubular members 80 as at 81. Threaded shafts 82 are slidable in the upper ends of the tubular members 80 and are longitudinally adjustable with respect thereto by hand wheels 83 threaded on the shafts 82 and bearing upon the upper ends of the tubular members 80. Engaging members 84 carried by the upper ends of the shafts 83 are adapted to engage the rails 85 of a conventional vehicle lift. Two of the engaging members 84 are preferably employed for each shaft 82 and are connected to the upper ends thereof by outwardly curved arms 86 as shown in Figure 11. This arrangement is preferably employed to provide ample space for the operation of the hand wheels 57 regardless of the width of the vehicle frame being rocked.

The operation of the form of the invention shown in Figures 1 to 6 inclusive is as follows:

The motor 25 drives the shaft 23 through the pulleys 28 and 30 and belt 29, and thus the worm 22 is driven to rotate the worm wheel 21. Rotation of the worm wheel obviously rotates the eccentric stub shaft 35 about the axis of the relatively large shaft 20, and the circular motion of the stub shaft 35 is transmitted to the crosshead 38. This member is slidable on the shaft 40, and accordingly the component of movement of the crosshead 38 laterally with respect to the apparatus transmits no motion to any part of the apparatus since the crosshead is slidable on the shaft 40. The component of movement of the crosshead longitudinally with respect to the apparatus, however, transmits longitudinal reciprocating movement to the carrier 44.

The reciprocating movement of the carrier 44 is utilized for rocking the bell crank levers 49 about their pivot shafts 48, and the bell crank levers, in turn, transmit a reciprocating motion to the tubular members 53 and jack shafts 55. Since the bell crank levers are oppositely rocked by the carrier 44, it will be apparent that one jack shaft 55 will be moving downwardly while the other is moving upwardly and thus the vehicle body will be rocked on the chassis.

In this connection attention is invited to the fact that the weight of the vehicle body is relieved to a substantial extent from the springs of the vehicle by rotation of the hand wheels 57, and when the vehicle body is rocked with the weight of the body relieved from the springs, the spring leaves, shackle bolts, etc. of the vehicle may be thoroughly and effectively lubricated. After the lubricating operation has been completed, the motor may be stopped and the hand wheels 57 rotated to lower the vehicle body and permit it to rest in the normal manner on the springs of the vehicle.

The present apparatus is advantageous over prior constructions for a number of reasons. For example, the use of the elongated openings 52 in the casing 10 prevents swinging movement of the tubular members 53 longitudinally with respect to a motor vehicle, but the tubular members are free to swing within reasonable limits transversely with respect to the vehicle, thus permitting the use of the apparatus with vehicle frames of varying widths, or upon different parts of the frame of any given vehicle. The openings 52 are long enough to permit the apparatus to be used with any motor vehicle frame, but they obviously limit the swinging movement of the tubular members 53 to prevent these members from swinging downwardly at a substantial angle from the vertical, thus retaining them in proper position with respect to the pins 51.

It is highly desirable in an apparatus of this character to completely house all of the working parts as a safety measure and to protect the working parts from injury. In many prior constructions, structural elements have been employed for supporting the working parts of the apparatus, and a separate hood or housing has been placed over the mechanism. In the present apparatus a single structure may be used both as the supporting means and as the means for covering the operating mechanism. The casing 10 is preferably in the form of a casting which is sufficiently heavy to support the motor, transmission gearing and the thrust transmitted by the bell crank levers during the rocking operation. At the same time the casing adequately protects the mechanism and prevents any injury to operators using or working around the mechanism. The trnasmission means employed between the reduction gearing and the bell crank levers is greatly simplified by employing the crosshead 38 for translating the rotary motion of the shaft 20 into the reciprocating motion of the carrier 44, and the use of the single straight line carrier 44 permits the use of strap material in the making of this member. Thus it will be apparent that the entire mechanism is greatly simplified and its operation improved. While the strap member 44 partakes principally of a longitudinal reciprocating motion, it has a slight vertical component of movement due to the swinging of the bell crank levers 49. This vertical component of movement is compensated for by the vertically slidable reception of the eccentric 35 in the opening 36.

The tubular members 53 are readily removable merely by lifting them vertically, and they are adapted to be employed as handles for transporting the apparatus from place to place around a service station. The apparatus may be tilted to roll on the rollers 58 at one side of the apparatus much after the manner of a two wheeled truck, and thus the portability of the apparatus is increased. The operating mechanism is readily accessible merely by removing the tubular members 53 and by inverting the casing 10, the entire bottom of the apparatus being open to permit access to the working parts.

The operation of the form of the invention shown in Figures 7, 8 and 9 is substantially identical with the form of the invention previously described. The modified form of the apparatus referred to is provided with the arms 77 whereby the apparatus may be supported by the sides of a vehicle greasing pit, and the engaging heads 74 may be moved upwardly into engagement with the vehicle side frames by rotating the hand wheels 73, this operation being carried out to a substantial degree to relieve the vehicle springs of the weight of the body. The jack shafts are readily removed from the apparatus by first removing the engaging heads 74, which have a sliding engagement with the jack shaft ends 76, and by then lifting the jack shaft from the lower end to disengage the trunnions from the sockets 69. The jack shafts then may be lowered into the greasing pit and removed from the bottom of the apparatus.

The form of the apparatus shown in Figures 10 and 11 is particularly adapted for use where a vehicle is rocked while supported upon a conventional vehicle lift. Such a lift usually comprises either a pair of vehicle frame supporting rails, such as the rails 85, or a pair of parallel supporting rails upon which the tires of the vehicle rest, and a central relatively heavy shaft is adapted to raise and lower the rails. Such supporting shaft is rotatable to facilitate various operations on the motor vehicle, as is well known. Since the present apparatus extends transversely of a motor vehicle with the heads 56 engaging the side rails of a vehicle frame as shown in Figure 10, it obviously is necessary for the apparatus to be arranged between the supporting shaft of the lift and one end of the rails. Since the jack shafts are arranged nearly in vertical position, they do not brace the vehicle to a sufficient extent to prevent limited rotation of the lift on the supporting shaft, and if pressure is applied against a lubricant fitting of the vehicle, such as one of the shackle bolt fittings, there is a tendency for the vehicle lift to rotate about the axis of its supporting shaft. Such operation places undue strain upon the jack shafts and associated parts.

In the form of the invention shown in Figures 10 and 11, the rocking mechanism is placed in operative relation with respect to the vehicle by turning the hand wheels 57 to lift the weight of the vehicle body from the running gear. The additional weight thus placed on the casing 10 causes the rollers to move relatively upwardly to permit the casing 10 to seat firmly upon the surrounding surface. The engaging members 84 are then elevated by the hand wheels 83 to bring them into engagement with the rails 85 of the vehicle lift in the manner shown in Figure 10. Since the shafts 82 are crossed as also shown in Figure 10, it will be apparent that the lift rails are rigidly fixed against rotation about the axis of the lift shaft. Accordingly any tendency of the lift to rotate is completely eliminated.

Where the term "strap" is employed in the claims, it is understood that this expression excludes any connecting member between the bell crank levers which is capable of transmitting force under longitudinal compression. Therefore, the word "strap" is intended to define a narrow strip of some flexible material which is capable of transmitting motion only under tension. This device in the present invention is of substantial importance inasmuch as it minimizes the cost of manufacture of the device and provides a particularly efficient operation.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a rigid hollow protective cover casing, a pair of vehicle frame engaging and rocking members projecting upwardly from said casing, a pair of oppositely arranged bell crank levers pivotally supported within said casing and each having one arm connected to one of said rocking members, a strap connecting the other arms of said levers, and means housed within said casing and carried thereby for reciprocating said strap.

2. Apparatus of the character described comprising a rigid hollow protective cover casing, a pair of vehicle frame engaging and rocking members projecting upwardly from said casing, a pair of oppositely arranged bell crank levers pivotally supported within said casing and each having one arm connected to one of said rocking members, a strap connecting the other arms of said levers, a motor housed within and carried by said casing, a speed reduction unit housed within and carried by said casing and driven by said motor, and a crosshead driven by said reduction unit and connected to said strap to reciprocate the latter.

3. Apparatus of the character described comprising a hollow rigid casing having a top wall provided in adjacent end portions with openings, a pair of vehicle rocking posts projecting upwardly through said openings and having their upper ends engageable with a vehicle frame, said openings being substantially equal in width to the diameter of said posts and elongated in the common vertical plane of said posts, means connecting said posts together for simultaneous opposite reciprocation, and means housed within and carried by said casing for transmitting movement to said connecting means.

4. Apparatus of the character described comprising a hollow rigid casing having a top wall provided in adjacent end portions with openings, a pair of vehicle rocking posts projecting upwardly through said openings and having their upper ends engageable with a vehicle frame, said openings being substantially equal in width to the diameter of said posts and elongated in the common vertical plane of said posts, a pair of oppositely arranged bell crank levers each having one arm connected to the lower end of one of said posts, motion transmitting means connecting the other arms of said levers, and means arranged within and carried by said casing for operating said motion transmitting means.

5. Apparatus of the character described comprising a support, a pair of vehicle rocking posts extending upwardly from said support, means connecting said posts together for opposite reciprocatory movement, and including a horizontal reciprocating member, a motor, a speed reduction unit driven by said motor and including a rotary power take off shaft, an eccentric carried by said shaft and a crosshead operatively connected to said eccentric for transmitting movement to said reciprocating member, said crosshead being freely movable transversely with respect to said reciprocating member.

6. Apparatus of the character described comprising a support, a pair of vehicle rocking posts extending upwardly from said support, means connecting said posts together for opposite reciprocatory movement and including a horizontal reciprocating member, a motor, a speed reduction unit driven by said motor and including a rotary power take off shaft, an eccentric carried by said shaft, a transverse shaft carried by said reciprocating member, and a crosshead slidably mounted on said transverse shaft and connected to said eccentric.

7. Apparatus of the character described comprising a rigid hollow casing having a top wall and a pair of transverse walls, a pair of upstanding vehicle rocking posts, a pair of oppositely arranged bell crank levers each pivotally supported by one of said transverse walls and having one arm connected to one of said posts, a motion transmitting strap connected rectilinearly between the other arms of said levers, and a motor housed wholly within said casing for actuating said motion transmitting strap.

8. Apparatus of the character described comprising a rigid hollow casing having a top wall and a pair of transverse walls, a pair of upstanding vehicle rocking posts, a pair of oppositely arranged bell crank levers each pivotally supported by one of said transverse walls and having one arm connected to one of said posts, a motion transmitting member connected between the other arms of said levers, a motor housed within said casing and secured to said top wall, a speed reduction unit housed within said casing and secured to said top wall and driven by said motor, said reduction unit having a vertical power take off shaft provided with an eccentric, and a crosshead fixed against longitudinal movement with respect to said motion transmitting member and transversely movable with respect thereto, said crosshead being connected to said eccentric.

9. Apparatus of the character described comprising a support, a pair of upstanding posts engageable with the frame of a motor vehicle, means for oppositely reciprocating said posts to rock the vehicle frame, and means carried by said support for engaging a lift on which the vehicle is arranged to prevent rotation of the lift.

10. Apparatus of the character described comprising a support, a pair of upstanding posts engageable with the frame of a motor vehicle, means for oppositely reciprocating said posts to rock the vehicle frame, and a pair of crossed posts pivotally connected at their lower ends to said support and having means at their upper ends engageable with the rails of a lift on which the vehicle is arranged.

11. The combination with a vehicle lift rotatably supported by a central vertical shaft, of a support, a pair of upstanding posts having means at their upper ends for engaging the frame of a vehicle on said lift, means for oppositely reciprocating said posts to transmit rocking motion to the vehicle frame, and means carried by said support and engageable with the vehicle lift for preventing rotation thereof.

12. Apparatus of the character described comprising a pair of spaced oppositely arranged bell crank levers lying in a common vertical plane and pivotally supported intermediate their ends, each bell crank lever having a substantially vertical arm and a substantially horizontal arm, a strap pivotally connected at its ends to the ends of said vertical arms, said strap lying in a horizontal plane coincident with the plane of the pivotal connections of said strap with said vertical arms, and means for reciprocating said strap.

13. Apparatus of the character described comprising a pair of spaced oppositely arranged bell crank levers lying in a common vertical plane and pivotally supported intermediate their ends, each bell crank lever having a substantially vertical arm and a substantially horizontal arm, a strap pivotally connected at its ends to the ends of said vertical arms, said strap lying in a horizontal plane coincident with the plane of the pivotal connections of said strap with said vertical arms, a speed reduction unit, a motor driving said unit, and a crosshead driven by said unit and connected to said strap to reciprocate the latter.

14. Apparatus of the character described comprising a pair of spaced oppositely arranged bell crank levers lying in a common vertical plane and pivotally supported intermediate their ends, each bell crank lever having a substantially vertical arm and a substantially horizontal arm, a strap pivotally connected at its ends to the ends of said vertical arms, said strap lying in a horizontal plane coincident with the plane of the pivotal connections of said strap with said vertical arms, a vertical shaft having an eccentric, a horizontal rod carried by said strap transversely thereof, and a crosshead operative by said eccentric and slidable on said rod.

15. Apparatus of the character described comprising a supporting structure, a pair of vehicle rocking members projecting upwardly from said supporting structure, a pair of oppositely arranged bell crank levers pivotally supported by said structure and each having one arm connected to one of said rocking members, a strap connected to afford a rectilinear power-transmitting connection between the other arms of said levers, and means for reciprocating said strap.

16. Apparatus of the character described comprising a supporting structure, a pair of vehicle rocking members projecting upwardly from said supporting structure, a pair of oppositely arranged bell crank levers pivotally supported by said structure and each having a substantially horizontal arm connected to one of said rocking members, the other arm of each bell crank lever being substantially vertical, a strap connected to afford a rectilinear power-transmitting connection between the other arms of said levers, and means including speed reduction mechanism for reciprocating said strap.

17. In an apparatus of the character described, a vehicle rocking assembly comprising a pair of spaced vehicle rocking members, a pair of oppositely arranged bell crank levers each having an arm outstanding with respect to the other bell crank lever and connected to one of said rocking members, each bell crank lever further including an upwardly projecting arm, and a strap connected to afford a rectilinear power-transmitting connection between said last named arms, a motor, and transmission means connected between said motor and said assembly for effecting simultaneous rocking movement of said bell crank levers.

PHILIP J. KROLL.